A. F. BERGHOLZ AND C. O. JOHNSON.
SANITARY STRAINER.
APPLICATION FILED NOV. 30, 1918.

1,413,892.

Patented Apr. 25, 1922.

UNITED STATES PATENT OFFICE.

AUGUST F. BERGHOLZ AND CARL O. JOHNSON, OF JEFFERSON, WISCONSIN.

SANITARY STRAINER.

1,413,892. Specification of Letters Patent. Patented Apr. 25, 1922.

Application filed November 30, 1918. Serial No. 264,802.

*To all whom it may concern:*

Be it known that we, AUGUST F. BERGHOLZ and CARL O. JOHNSON, citizens of the United States, and residents of Jefferson, in the county of Jefferson and State of Wisconsin, have invented new and useful Improvements in Sanitary Strainers, of which the following is a description, reference being had to the accompanying drawings, which are a part of this specification.

The invention relates to milk strainers, the general object being to make a device of this character consisting of few parts which may be readily taken apart for cleaning.

The several features are fully described and explained in the specification and shown in the accompanying drawing in which.

Figure 1:
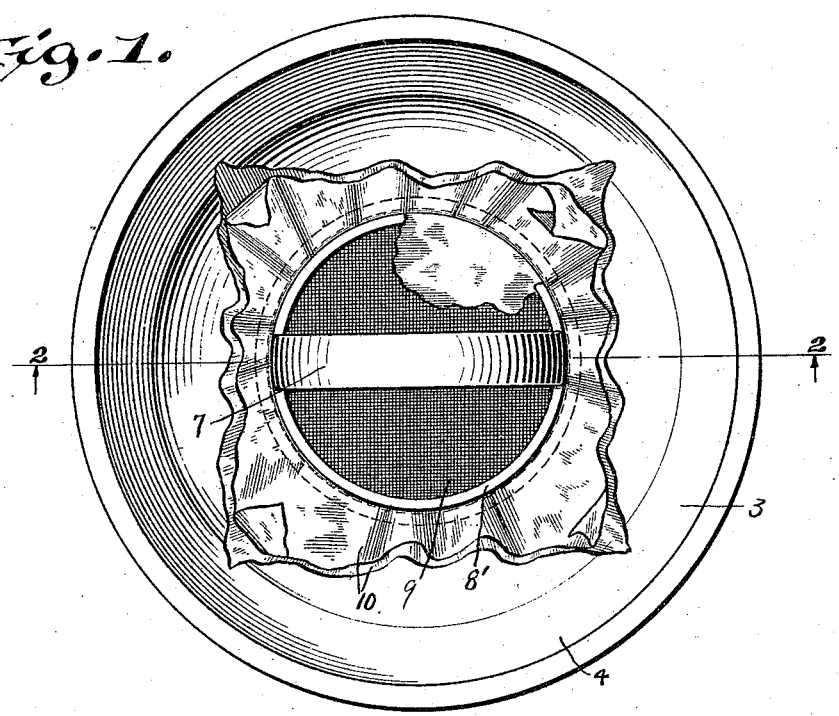
Fig. 1 is a plan view of the device embodying the invention.

In the drawing the numeral 3 designates a funnel having a cup shaped portion 4 and a cylindrical portion 5 which is adapted to fit into the neck of the usual milk can.

Adapted to fit loosely or telescope within the cylindrical portion or neck 5 of the funnel is a tube 6 provided with a bailed handle 7, a beaded edge 8, and an inwardly extending annular flange 8′ to which the marginal edges of a screen 9 are secured.

Figure 2:
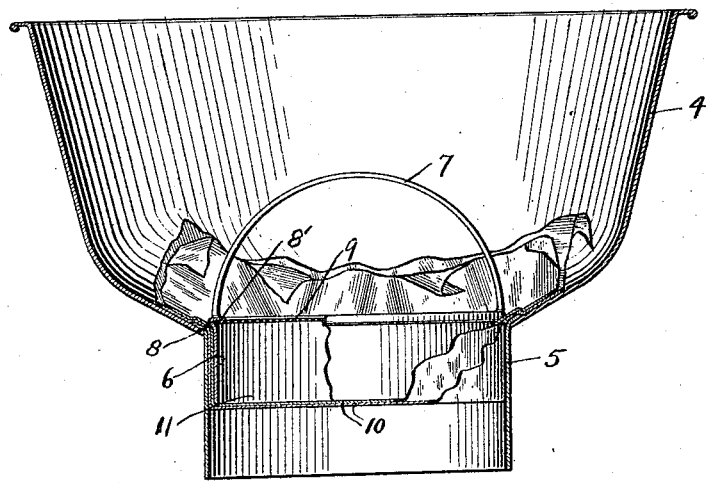
Fig. 2 is a section taken on the line 2—2 of Fig. 1.

The tube 6 is made to fit loosely within the funnel neck so that one or two layers of strainer cloth 10, such as cheese cloth, may be placed over the lower end 11 of the tube 6 then drawn up around the outside and the whole then inserted into the upper end of the neck 5 of the funnel and firmly held, the beaded edge 8 also limiting the inward movement of the tube with respect to the funnel as shown in Fig. 2.

With the parts thus in place the screen 9 removes the coarser and the cloths 10 the finer sediment from the milk as it is poured into the can through the funnel 3 and when the tube 6 is removed the cloth may be taken out and removed and both the tube and the funnel readily cleaned.

We are aware that the details of construction herein shown and described are subject to some modification and change and we therefore desire it to be understood that such changes in construction as come within the scope of the appended claim are within the spirit of our invention.

What we claim as our invention is:

A strainer, comprising a cylindrical neck portion and a cup shaped portion connected to the upper edge thereof, an open ended tube of slightly less diameter than the neck portion and telescoping therein, the upper edge portion of said tube being flared outwardly to form a supporting annular bead and then flanged inwardly to provide a screen support, said flared portion limiting the downwardly movement of the tube within the neck portion, a screen extending across the upper end of the tube and connected to the lower portion of the inwardly flanged portion of the tube, a bail connected to the upper portion of said flange, and a straining cloth removably stretched across the lower end of the tube and extending upwardly between the tube and the neck and between the flared portion and the cup like portion.

In testimony whereof, we affix our signatures.

AUGUST F. BERGHOLZ.
CARL JOHNSON.